United States Patent Office 2,738,259
Patented Mar. 13, 1956

2,738,259

SURFACE TREATMENT OF GERMANIUM

Ray C. Ellis, Jr., Allston, Mass., assignor to Raytheon Manufacturing Company, Waltham, Mass., a corporation of Delaware No Drawing. Application February 24, 1954, Serial No. 412,375

7 Claims. (Cl. 41—42)

This invention relates to the surface treatment of semi-conductor materials, and more particularly to chemical etchants as applied to germanium surfaces to improve the electrical characteristics thereof and to simplify the recovery of germanium from the etching solutions.

In preparing germanium for use in rectifiers, transistors, phototransistors and the like, the electrical characteristics of the final device are determined to a large degree by the surface condition of the germanium component utilized therein. It is well known that various combinations of chemical etching reagents can be used to clean the surface areas and remove lattice distortions from bodies of germanium. However, these etching solutions commonly contain an oxidizing agent and hydrofluoric acid or a fluoride in some form, and the resulting reaction in such an etching solution leaves that portion of the germanium which has been chemically removed from the principal germanium body in a tightly bound compound. Furthermore, special plastic containers, such as polyethylene containers, are needed to hold the fluoride etchants, and these solutions are relatively expensive. The value of germanium and the quantities used in the mass production of the above-mentioned devices make it quite important to recover germanium readily and economically from the etching solution. When fluoride etching solutions are employed, these recovery operations are quite involved. The invention herein described pertains to new etching solutions for germanium whereby the ease in handling the solution is facilitated, the cost of the solution is lowered, and the recovery of germanium is greatly simplified.

In the commercial manufacture of transistors, for example, germanium single crystals can be grown by the so-called seed-pulling method, and by properly employing doping techniques to introduce certain impurities into the germanium melt, these single crystals can be made n-type or p-type, or they can contain junctions of the n-p or n-p-n type. In all cases, it is then necessary to cut the crystal into shapes suitable for device fabrication. The most common method employed to cut a crystal of germanium involves sawing the crystal into small dice or chips with a diamond impregnated metal wheel. To remove any superficial layer of disturbed material left on these chips by the mechanical preparation thereof, specific solutions suitable for etching germanium surfaces at predetermined rates are employed. As mentioned above, the known etches for germanium have in common a surface oxidant and a complexing agent, hydrofluoric acid, which dissolves the oxide as it is formed. As previously noted, it is necessary to use special containers to hold these fluoride etching solutions, and they are expensive as compared to the novel etching solutions described below.

This invention involves the use of a polyhydroxy compound selected from the group consisting of sugars and glycols in combination with a compatible oxidizing agent to etch germanium at a measurable controlled rate. As one example of a specific embodiment of this invention, a solution composed of a mixture of two parts concentrated nitric acid by volume to one part saturated sucrose by volume has been used to etch germanium at rate of 1.2 mils per hour. By increasing or decreasing the temperature and the concentrations of the compounds employed in the etching solution, the etching rate can be varied as desired.

Another example of how these polyhydroxy compounds can be used to etch germanium is a mixture composed of two parts by volume of hydrogen peroxide and one part by volume of propylene glycol. This etching solution was found to thin germanium chips at a rate of .4 mil per hour. It should be noted that sucrose can also be used in combination with hydrogen peroxide to form a suitable etching solution. Furthermore, ethylene glycol can also be used in combination with hydrogen peroxide to form an etching solution which will thin germanium at a measurable controlled rate. In addition mannitol, a sugar, can be combined with either nitric acid or hydrogen peroxide to create an etchant which is quite suitable for etching germanium chips.

In the case of each of these possible combinations of etching solutions the recovery of germanium is greatly simplified. Also the etching solutions can be handled with greater safety and the containers employed can be made of glass, for example, rather than a plastic material as required when hydrofluoric acid etches are used. The cost of the novel etching solutions described above is relatively low and additional control agents are not needed to regulate the speed of the removal of material.

However, this invention should not be limited to the particular details described above as many equivalents will suggest themselves to those skilled in the art. For example, the concentrations of the polyhydroxy compound and the oxidizing agent used therewith can be varied as desired in each mixture. Furthermore, it has been determined that all sugars and glycols can be used in combination with a compatible oxidizing agent to etch germanium at a measurable controlled rate. For example, glycerine, a glycol, can be used in combination with hydrogen peroxide to form one of the many possible combinations of glycol etching solutions which have been described herein. Also the temperatures to which these solutions are employed can be changed to control the etching rate. Therefore, it is desired that the appended claims be given a broad interpretation commensurate with the scope of the invention within the art.

What is claimed is:

1. The method of improving the electrical characteristics of a germanium body, said method comprising subjecting the surface of said body to a fluid mixture from which excess germanium is readily reclaimable, said fluid mixture being comprised of a polyhydroxy compound selected from the group consisting of sugars and glycols, and a compatible oxidizing agent, and then washing said fluid mixture from said surface.

2. The method of improving the electrical characteristics of a germanium body, said method comprising subjecting the surface of said body to a fluid mixture from which excess germanium is readily reclaimable, said fluid mixture being comprised of a polyhydroxy compound selected from the group consisting of sugars and glycols and a compatible oxidizing agent selected from the group consisting of nitric acid and hydrogen peroxide, and then washing said fluid mixture from said surface.

3. The method of improving the electrical characteristics of a germanium body, said method comprising subjecting the surface of said body to a fluid mixture from which excess germanium is readily reclaimable, said fluid mixture being comprised of sucrose and an oxidizing agent selected from the group consisting of hydrogen peroxide and nitric acid, and then washing said fluid mixture from said surface.

4. The method of improving the electrical characteristics of a germanium body, said method comprising subjecting the surface of said body to a fluid mixture from which excess germanium is readily reclaimable, said fluid mixture being comprised of mannitol and an oxidizing agent selected from the group consisting of hydrogen peroxide and nitric acid, and then washing said fluid mixture from said surface.

5. The method of improving the electrical characteristics of a germanium body as set forth in claim 4 wherein said fluid mixture is comprised of propylene glycol and hydrogen peroxide.

6. The method of improving the electrical characteristics of a germanium body as set forth in claim 4 wherein said fluid mixture is comprised of ethylene glycol and hydrogen peroxide.

7. The method of improving the electrical characteristics of a germanium body as set forth in claim 4 wherein said fluid mixture is comprised of glycerine and hydrogen peroxide.

References Cited in the file of this patent

UNITED STATES PATENTS

| | | |
|---|---|---|
| 2,393,875 | Van Dusen | Jan. 29, 1946 |
| 2,542,727 | Theuerer | Feb. 20, 1951 |
| 2,593,449 | Hesch | Apr. 22, 1952 |
| 2,614,913 | Reindl et al. | Oct. 21, 1952 |

OTHER REFERENCES

Prescott et al.: Sequestering agents in Aluminum Etching, Metal Finishing, October 1953, pp. 65, 66 and 67.